(12) United States Patent
Beall et al.

(10) Patent No.: US 11,236,012 B2
(45) Date of Patent: Feb. 1, 2022

(54) BORON PHOSPHATE GLASS-CERAMICS WITH LOW DIELECTRIC LOSS

(71) Applicant: CORNING INCORPORATED, Corning, NY (US)

(72) Inventors: George Halsey Beall, Big Flats, NY (US); Heather Debra Boek, Corning, NY (US); Ling Cai, Painted Post, NY (US); Jin Su Kim, Seoul (KR); Dean Michael Thelen, Addison, NY (US); Mark Owen Weller, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/040,070

(22) PCT Filed: Mar. 28, 2019

(86) PCT No.: PCT/US2019/024461
§ 371 (c)(1),
(2) Date: Sep. 22, 2020

(87) PCT Pub. No.: WO2019/191350
PCT Pub. Date: Oct. 3, 2019

(65) Prior Publication Data
US 2021/0024407 A1 Jan. 28, 2021

Related U.S. Application Data

(60) Provisional application No. 62/649,240, filed on Mar. 28, 2018.

(51) Int. Cl.
*B32B 17/06* (2006.01)
*C03C 10/00* (2006.01)
(Continued)

(52) U.S. Cl.
CPC .......... *C03C 10/0054* (2013.01); *B32B 17/06* (2013.01); *C03B 32/02* (2013.01);
(Continued)

(58) Field of Classification Search
CPC .............. B32B 17/06; B32B 2307/204; B32B 2457/00; C03C 10/0054; C03C 10/0009
See application file for complete search history.

(56) References Cited

U.S. PATENT DOCUMENTS 4,153,491 A 5/1979 Swiss et al.
4,171,544 A 10/1979 Hench
(Continued)

FOREIGN PATENT DOCUMENTS

CA 1102953 A 6/1981
CA 1109664 A 9/1981
(Continued)

OTHER PUBLICATIONS

B.G. Aitken and R.E. Youngman, "Borophosphosilicate glasses: properties and structure", Proc. Fifth Int. Conf. on Borate Glasses, Crystals and Melts, Phys. Chem. Glasses: Eur. J. Glass Sci. Technol. B, 47 (4), 381-387 (2006).
(Continued)

*Primary Examiner* — Elizabeth E Mulvaney
(74) *Attorney, Agent, or Firm* — Svetlana Short (57) ABSTRACT

A glass-ceramic that includes: $SiO_2$ from about 35 mol % to about 80 mol %; $B_2O_3$ from about 10 mol % to about 50 mol %; $P_2O_5$ from about 10 mol % to about 50 mol %; and an optional addition of one or more of CaO, MgO and $Bi_2O_3$ from 0 mol % to about 5 mol %, wherein the glass-ceramic further comprises a boron-phosphate crystalline phase.

24 Claims, 4 Drawing Sheets

(51) Int. Cl.
  *C03B 32/02* (2006.01)
  *C03B 17/06* (2006.01)
(52) U.S. Cl.
  CPC .... *C03C 10/0009* (2013.01); *B32B 2307/204* (2013.01); *B32B 2457/00* (2013.01); *C03B 17/064* (2013.01); *C03C 2204/00* (2013.01)

(56) References Cited

U.S. PATENT DOCUMENTS

| | | | |
|---|---|---|---|
| 4,256,792 | A | 3/1981 | Koepke et al. |
| 4,833,104 | A * | 5/1989 | MacDowell ........ C03C 10/0054 501/10 |
| 5,250,474 | A | 10/1993 | Siebers |
| 5,277,723 | A | 1/1994 | Kodama et al. |
| 5,329,695 | A | 7/1994 | Traskos et al. |
| 5,840,382 | A | 11/1998 | Nishide et al. |
| 6,104,264 | A | 8/2000 | Ishikawa et al. |
| 6,700,078 | B2 | 3/2004 | Farquhar et al. |
| 7,295,420 | B2 | 11/2007 | Kojima et al. |
| 7,378,326 | B2 | 5/2008 | Ahn et al. |
| 7,387,838 | B2 | 6/2008 | Rita |
| 7,605,479 | B2 | 10/2009 | Mohammed |
| 7,996,969 | B2 | 8/2011 | Ohaga et al. |
| 8,779,598 | B2 | 7/2014 | Yeung et al. |
| 9,455,064 | B2 | 9/2016 | Purushothaman et al. |
| 9,527,767 | B2 | 12/2016 | Ellison et al. |
| 2005/0266251 | A1 | 12/2005 | Rita |
| 2010/0260970 | A1* | 10/2010 | Yeh ...................... C04B 41/009 428/141 |
| 2013/0082895 | A1 | 4/2013 | Shiu et al. |
| 2014/0335331 | A1 | 11/2014 | Ellison et al. |
| 2016/0122226 | A1 | 5/2016 | Moseler et al. |
| 2018/0282201 | A1* | 10/2018 | Hancock, Jr. ........... C03C 3/083 |
| 2018/0326704 | A1* | 11/2018 | Harris .................... C03C 3/091 |

FOREIGN PATENT DOCUMENTS

| | | |
|---|---|---|
| CA | 1121616 A | 4/1982 |
| CA | 1123115 A | 5/1982 |
| CA | 1149700 A | 7/1983 |
| CA | 1156681 A | 11/1983 |
| CA | 1182480 A | 2/1985 |
| CA | 1239654 A | 7/1988 |
| CA | 1239655 A | 7/1988 |
| CA | 1266868 A | 3/1990 |
| CA | 2007658 A1 | 8/1990 |
| CN | 87107744 A | 4/1988 |
| CN | 1304894 A | 7/2001 |
| CN | 1902139 A | 1/2007 |
| CN | 1935739 A | 3/2007 |
| CN | 1993297 A | 7/2007 |
| DE | 1921128 A1 | 11/1970 |
| DE | 2451121 A1 | 5/1975 |
| DE | 2815312 A1 | 12/1978 |
| EP | 0202751 A1 | 11/1986 |
| EP | 0319146 A2 | 6/1989 |
| FR | 2041521 A5 | 1/1971 |
| GB | 0924996 A | 5/1963 |
| GB | 0943599 A | 12/1963 |
| GB | 1022681 A | 3/1966 |
| GB | 1023480 A | 3/1966 |
| GB | 1024871 A | 4/1966 |
| GB | 1028871 A | 5/1966 |
| GB | 1042782 A | 9/1966 |
| GB | 1063291 A | 3/1967 |
| GB | 1089202 A | 11/1967 |
| GB | 1108474 A | 4/1968 |
| GB | 1108475 A | 4/1968 |
| GB | 1124001 A | 8/1968 |
| GB | 1176522 A | 1/1970 |
| GB | 2020197 A | 11/1979 |
| GB | 2199028 B | 5/1990 |
| JP | 57-003739 A | 1/1982 |
| JP | 61-142759 A | 6/1986 |
| JP | 62-148336 A | 7/1987 |
| JP | 62-292646 A | 12/1987 |
| JP | 63-050344 A | 3/1988 |
| JP | 63-050345 A | 3/1988 |
| JP | 63-107838 A | 5/1988 |
| JP | 01-239038 A | 9/1989 |
| JP | 02-303184 A | 12/1990 |
| JP | 04-168931 A | 6/1992 |
| JP | 04-342367 A | 11/1992 |
| JP | 3941321 B2 | 7/2007 |
| JP | 2008-258528 A | 10/2008 |
| JP | 4597336 B2 | 12/2010 |
| KR | 10-0743986 B1 | 7/2007 |
| KR | 10-2008-0044771 A | 5/2008 |
| KR | 10-0945864 B1 | 3/2010 |
| MY | 140479 A | 12/2009 |
| WO | 87/07256 A1 | 12/1987 |
| WO | 91/10627 A1 | 7/1991 |
| WO | 2018/125736 A1 | 7/2018 |
| WO | 2019/191300 A1 | 10/2019 |
| WO | 2019/191302 A1 | 10/2019 |

OTHER PUBLICATIONS

G. Baret, R. Madar, and C. Bernard, J. Electrochem. Soc., 138 [9] 2836-2838 (1991).

Hsu et al., "Modified oxide sol-gel (MOSG) synthesis of borophosphosilicate glasses and glass-ceramics", J. Materials Science 30, 3123-3129 (1995).

International Search Report and Written Opinion of the International Searching Authority; PCT/US2019/024461; dated Jun. 24, 2019; 10 Pages; Commissioner for Patents.

J.F. MacDowell, "Boron phosphate glass-ceramics", Microelectronic Systems, Ceramic Transactions, Materials and Processes for Microelectronic Systems, 15, 90-95.

Kumta et al., "Novel low-temperature synthesis of glasses and glass-ceramics in the B2O3—SiO2—P2O5 system", J. Mat. Sci., vol. 28, pp. 1097-1106.

Kumta; "Processing of Interconnected Glass and Ceramic composites for Electronic Packaging", Report No. WL-TR-96-4082; Wright-Patterson AFB; Jul. 9, 1996, Appendix, Part II,, pp. 33-66.

Li et al.,"Low dielectric constant borophosphosilicate glass-ceramics derived from sol-gel process", Materials Letters 54, 25-29 (2002).

MacDowell and G.H. Beall, "Low K glass-ceramics for microelectronic packaging", Microelectronic Systems, 259-277.

W. J. Englert and F. A. Hummel, "Notes on the System B2O3—SiO2—P2O5. Part II. The Ternary System", J. Soc. Glass Technol., 39, 121-127 (1955).

Youngman et al., "Multi-nuclear NMR studies of borosilicophosphate glasses and microfoams", J. of Non-Crystalline Solids, 263&264, 111-116 (2000.

* cited by examiner

BORON PHOSPHATE GLASS-CERAMICS WITH LOW DIELECTRIC LOSS

CROSS-REFERENCE TO RELATED APPLICATIONS

This application claims the benefit of priority under 35 U.S.C. § 371 of International Application No. PCT/US2019/024461, filed on Mar. 28, 2019, which claims the benefit of priority under 35 U.S.C. § 119 of U.S. Provisional Application No. 62/649,240, filed Mar. 28, 2018, the content of which is incorporated herein by reference in its entirety.

FIELD OF THE DISCLOSURE

The disclosure relates to glass-ceramic compositions and articles, and more particularly to boron phosphate glass-ceramic compositions and articles with low dielectric loss characteristics.

BACKGROUND

Digital technologies continue to expand, particularly in terms of data connectivity and processing rates. For example, processing rates on the order of 1 Gbits/s are expanding to rates on the order of tens of Gbits/s. The corresponding electronic device technology to achieve these data rates likely will result in an expansion of signal transmission and receiving frequencies on the order of 1 GHz to the order of tens of GHz.

As these signal frequencies increase to accommodate increased data processing rates, the technical specifications and requirements related to absorption loss associated with the insulating materials employed in these devices take on greater importance. For example, as these higher frequency communication signals are used in these devices, the signals must pass through various physical barriers that otherwise attenuate or block these signals. Examples of these physical barriers are electrically-insulating substrates that are used in the fabrication of electronic circuits such as antennas, semiconductor circuits and signal transmission structures. The intended function of these barriers encompasses various non-electrical requirements including, but not limited to, mechanical support, electrical isolation, providing one or more surfaces for deposition of metals and semiconducting materials, minimal thermal expansion and compaction, interconnect capability, a capacity for relatively low-cost manufacturing, and scalability with regard to length, width and/or thickness to accommodate various electronic device configurations. Nevertheless, these barriers and substrates also play a role in the electrical performance of these electronic devices, particularly as the barriers and substrates are configured to transmit high frequency signals or are situated in close proximity to fields associated with increased signal frequencies transmitted by the devices. In particular, these physical barrier materials are not perfect insulators and are therefore associated with dielectric loss that can affect the intensity of signals transmitted through them.

Accordingly, there is a need for structures having compositions, particularly glass-ceramic compositions, that are suitable for electronic devices, electronic device substrates, and other comparable applications that can enable higher frequency communication in devices without a significant reduction in performance as it relates to other non-electrical device requirements. Further, there is a need for glass-ceramic compositions, with these advantageous electrical properties, that are also highly formable and amenable to manufacturing with relatively low-cost manufacturing processes, such as down-draw and slot-draw glass formation processes.

SUMMARY OF THE DISCLOSURE

According to some aspects of the present disclosure, a glass-ceramic is provided that includes: $SiO_2$ from about 35 mol % to about 75 mol %; $B_2O_3$ from about 10 mol % to about 40 mol %; $P_2O_5$ from about 10 mol % to about 40 mol %; and an optional addition of one or more of CaO, MgO and $Bi_2O_3$ from 0 mol % to about 5 mol %. The glass-ceramic further comprises a boron-phosphate crystalline phase.

According to some aspects of the present disclosure, a glass-ceramic is provided that includes: $SiO_2$ from about 35 mol % to about 80 mol %; $B_2O_3$ from about 10 mol % to about 50 mol %; $P_2O_5$ from about 10 mol % to about 50 mol %; and an optional addition of one or more of CaO, MgO and $Bi_2O_3$ from 0 mol % to about 5 mol %. The glass-ceramic further comprises a loss tangent of 0.006 or less for signals having a frequency of 1 GHz or more.

According to some aspects of the present disclosure, a glass-ceramic is provided that includes: $SiO_2$ from about 35 mol % to about 80 mol %; $B_2O_3$ from about 10 mol % to about 50 mol %; $P_2O_5$ from about 10 mol % to about 50 mol %; and one or more of CaO, MgO and $Bi_2O_3$ from greater than 0 mol % to about 5 mol %. The glass-ceramic further comprises a loss tangent of 0.006 or less for signals having a frequency of 1 GHz or more.

According to some implementations of the foregoing aspects, the glass-ceramic further includes: $SiO_2$ from about 55 mol % to about 80 mol %; $B_2O_3$ from about 10 mol % to about 50 mol %; and $P_2O_5$ from about 10 mol % to about 50 mol %. In some embodiments, the glass-ceramic further includes: $Al_2O_3$ from about 0.005 mol % to about 1 mol % and/or $SnO_2$ from about 0.005 mol % to about 0.5 mol %. According to some embodiments of the foregoing aspects, the ratio of $B_2O_3$ to $P_2O_5$ ranges from 1:2 to 2:1.

According to additional implementations of the foregoing aspects, the glass-ceramic comprises an average coefficient of thermal expansion (CTE) of about $40 \times 10^{-7}/°$ C. to about $65 \times 10^{-7}/°$ C., as measured from 25° C. to 300° C. Further, in some embodiments, the glass-ceramic further comprises a loss tangent of 0.003 or less for signals having a frequency of 1 GHz or more.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As also used herein, the terms "glass article," "glass articles," "glass-ceramic article" and "glass-ceramic articles" are used in their broadest sense to include any object made wholly or partly of glass and/or glass-ceramics. Unless otherwise specified, all compositions are expressed in terms of mole percent (mol %). Coefficients of thermal expansion (CTE) are expressed in terms of $10^{-7}/°$ C. and represent a value averaged over a temperature range from 20° C. to 300° C., unless otherwise specified. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

The terms "relatively low CTE" and "low CTE" are used interchangeably in the disclosure with regard to clad layers fabricated from a glass-ceramic composition (e.g., prior to ion exchange) having a CTE that is lower than the CTE of a core layer, as employed in embodiments of glass-ceramic laminate articles with a core glass layer and clad glass-ceramic layers. In embodiments, the CTE of the clad layers, as comprising glass-ceramic compositions of the disclosure, is lower than the CTE of the core layer by at least about $5 \times 10^{-7}/°$ C.

The terms "mechanically strengthened" and "mechanical strengthening" are used in relation to the laminated glass-ceramic structures of the disclosure to mean a glass-ceramic or laminate that has been formed by laminating a high CTE core glass to low CTE clad glass-ceramic layer(s), thereby creating compressive stresses in the clad layers when the laminate is cooled following lamination. These compressive stresses can offset externally applied mechanical stresses (e.g., as applied through manufacturing-related handling, application-related loading and other sources), which have the net effect of strengthening the laminate.

The terms "loss tangent", "dielectric loss tangent" and "dielectric loss" are used interchangeably in this disclosure to refer to the inherent dissipation of electromagnetic energy (e.g., heat) afforded by a particular glass-ceramic composition, layer, or laminated structure associated with embodiments of this disclosure. The loss tangent can be parameterized in terms of either the loss angle ($\delta$) or the corresponding loss tangent (tan $\delta$). Permittivity is the ability of a substance, such as the glass-ceramics of the disclosure, to store electrical energy in the presence of an external electric field. Further, terms "permittivity" and the "average dielectric constant ($D_k$)" are used interchangeably within this disclosure. Permittivity is a complex quantity because it describes the phase and magnitude of polarization in relation to an oscillating field. The terms "average dielectric constant ($D_k$)" and "relative permittivity ($\varepsilon_r$)" are used interchangeably in the disclosure and are defined as the ratio between the real part of the complex permittivity and permittivity of free space. The "loss tangent" is expressed as the ratio between the imaginary and real part of the complex permittivity. In general, the average dielectric constant and loss tangent of a material is dependent on the frequency of the external field. Therefore, the dielectric property measured in the kHz range may not represent the dielectric property at microwave frequencies. Further, unless otherwise noted, the "loss tangent" and "average dielectric constant ($D_k$)" attributes of the glass-ceramics of the disclosure can be measured at frequencies of 1 GHz or greater according to a split post dielectric resonator (SPDR) or an open-cavity resonator configuration according to techniques as understood by those with ordinary skill in the field of the disclosure. The particular method chosen can be selected based on the sample thickness and its lateral dimensions.

Figure 1:
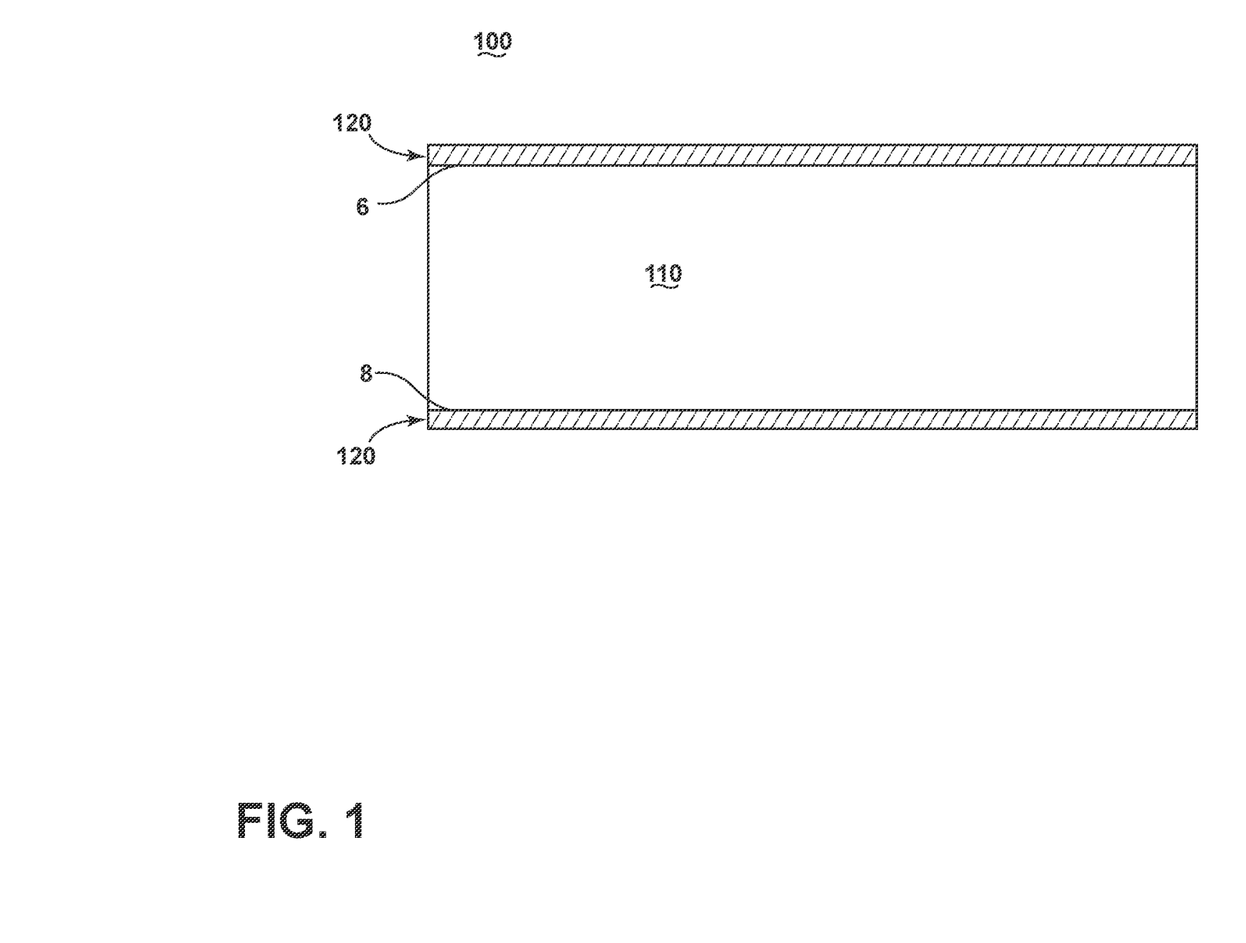
FIG. 1 is a schematic cross-section view of a glass-ceramic laminate article, according to embodiments of the disclosure.

Referring to the drawings in general and to FIG. 1 in particular, it will be understood that the illustrations are for the purpose of describing particular embodiments and are not intended to limit the disclosure appended claims thereto. The drawings are not necessarily to scale, and certain features and certain views of the drawings may be shown exaggerated in scale or in schematic form in the interest of clarity and conciseness.

Described in this disclosure are glass-ceramic compositions and articles, and more particularly boron phosphate glass-ceramic compositions and articles with low dielectric loss characteristics. These glass-ceramic compositions and articles comprise network formers $SiO_2$, $B_2O_3$ and $P_2O_5$. Further, these glass-ceramic compositions and articles optionally can include one or more of CaO, MgO and $Bi_2O_3$. Aspects of these glass-ceramic compositions and articles are substantially alkali metal-free.

More generally, the glass-ceramic compositions and articles disclosed herein comprise a boron-phosphate-silicate glass composition with varying levels of boron-phosphate crystalline phase(s). These glass-ceramics, including as employed in layers of laminate glass-ceramic articles, generally possess low dielectric loss characteristics. The glass-ceramics are preferably alkali-free and upon being subjected to ceramming, the mineral B(PO4) crystallizes during heat-treatment. As a result, the remaining glass constituent is relatively silica-rich, leaving the balance closer to pure $SiO_2$, which has very good dielectric properties. For example, some aspects of the disclosure are directed to glass-ceramic compositions comprising a loss tangent of 0.006 or less for signals having a frequency of 1 GHz or more. In addition, these glass-ceramic compositions are generally characterized by relatively low CTE values, e.g., less than $70 \times 10^{-7}/^\circ$ C., which can make them well-suited for use as clad layers in laminates (e.g., mechanically strengthened laminates) having core glass layers with higher CTE values.

Implementations of the glass-ceramic compositions and glass-ceramic articles of the disclosure are suitable for electronic devices, electronic device substrates, and other comparable applications that can enable higher frequency communication in devices without a significant reduction in performance as it relates to other non-electrical device requirements. For instance, as higher frequency communication signals are used in these devices, the signals must pass through various physical barriers that otherwise attenuate or block these signals. As such, the glass-ceramic compositions and articles of the disclosure can be well-suited for use as these barriers. Examples of these physical barriers are: electrically-insulating substrates that are used in the fabrication of electronic circuits such as antennas, semiconductor circuits and signal transmission structures; and device covers and other related structures that can be employed to house circuits and other electronic device components employed in electronic devices operating at high signal frequencies.

Further, some aspects of these glass-ceramic compositions of the disclosure are formable by down-draw processes that are known in the art, such as slot-draw and fusion-draw processes. The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for various personal electronic devices.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and may not require subsequent finishing.

In order to be fusion drawable, a glass-ceramic composition desirably has a sufficiently high liquidus viscosity (i.e., the viscosity of a molten glass at the liquidus temperature). In some implementations of the disclosure, the glass-ceramic compositions have a liquidus viscosity of greater than 5 kPoise, greater than 10 kPoise, greater than 50 kPoise, or even greater than 100 kPoise.

As noted above, a traditional fusion draw process is accomplished using a single isopipe, resulting in a homogeneous glass product. A more complicated fusion draw process can be used to form laminate glass-ceramic articles of the disclosure. In a laminate fusion draw process, two isopipes are employed to form a laminated sheet comprising a core glass composition (relatively high CTE) surrounded on either or both sides by outer clad layers comprising a glass-ceramic composition, as described in this disclosure. One of the advantages of a laminate fusion process is that when the CTE of the clad glass-ceramic is less than that of the core glass layer, the CTE differences (i.e., CTE mismatch) between the two elements results in the development of compressive stress in the outer clad layer. This compressive stress increases the strength of the final laminate glass-ceramic product without the need for additional strengthening, e.g., by an ion exchange treatment.

In some implementations, two sheets of down-drawn glass-ceramic compositions of the disclosure can be laminated through a rolling process. Such compositions preferably have a liquidus viscosity from about 5 kPoise to about 10 kPoise. The sheets are rolled together, and then subjected to a 'cookie-cut' step to form the resulting laminate into a plate form.

Referring now to FIG. 1, in some embodiments, a glass-ceramic composition according to the disclosure can be employed to form a glass-ceramic laminate 100. As noted earlier, the glass-ceramic laminate 100 is exemplary; consequently, the glass-ceramic compositions of the disclosure can be employed in other articles, forms and structures, as noted earlier (e.g., as non-laminate substrates for electronic devices, non-laminate device covers, etc.). Referring again to the glass-ceramic laminate 100, it comprises a core glass layer 110 surrounded by a pair of clad layers 120, each comprising a glass-ceramic composition according to the disclosure. As shown in exemplary form in FIG. 1, a pair of clad layers 120 are laminated to the core glass layer 110 at its primary surfaces 6, 8. Further, the core glass layer 110 of the glass-ceramic laminate 100 has a CTE that is greater than or equal to the CTE of glass-ceramic composition employed in the clad layers 120.

According to embodiments, the composition of the core glass layer 110 can be configured with a glass composition such that it has a CTE that is the same or higher than the CTE of each of the plurality of clad layers 120. For example, the core glass layer 110 can be formed from a glass composition which includes: from about 70 mol % to about 80 mol % $SiO_2$; from about 0 mol % to about 8 mol % $Al_2O_3$; from about 3 mol % to about 10 mol % $B_2O_3$; from about 0 mol % to about 2 mol % $Na_2O$; from about 10 mol % to about 15 mol % $K_2O$; and from about 5 mol % to about 6 mol % of alkaline earth oxide, wherein the alkaline earth oxide is at least one of CaO, SrO, and BaO without containing MgO. One example glass composition for the core glass layer 110 includes: 71.9 mol % $SiO_2$; 7.8 mol % $Al_2O_3$; 0 mol % $B_2O_3$; 10.1 mol % SrO; 0.1 mol % $SnO_2$; and 10.1 mol % BaO. Another example glass composition for the core glass layer 110 includes: 71.2 mol % $SiO_2$; 7.8 mol % $Al_2O_3$; 1.0 mol % $B_2O_3$; 10 mol % SrO; 0.1 mol % $SnO_2$; and 10 mol % BaO. A further example glass composition for the core glass layer 110 is Corning® Eagle XG® glass.

According to some implementations of the glass-ceramic laminate 100, the core glass layer 110 can be fabricated from an alkali aluminosilicate glass. In one non-limiting example, the core glass layer 110 is an alkali aluminosilicate glass having the composition 66.9 mol % $SiO_2$, 1.1 mol % $Al_2O_3$, 0.58 mol % $B_2O_3$, 7.45 mol % $Na_2O$, 8.39 mol % $K_2O$, 5.78 mol % MgO, 0.58 mol % CaO, 0.2 mol % $SnO_2$, 0.01 mol % $ZrO_2$, and 0.01 $Fe_2O_3$, with a strain point of 572° C., and anneal point of 629° C., a softening point of 888° C., and a CTE of $95.5 \times 10^{-7}$/° C.

Referring again to FIG. 1, each of the plurality of clad layers 120 of the glass-ceramic laminate 100 can be configured with a composition such that it has a CTE that is the same as or lower than the CTE of the core glass layer 110. For example, each of the clad layers 120 can be formed from a glass-ceramic composition which includes: from about 35 mol % to about 75 mol % $SiO_2$; from about 10 mol % to about 40 mol % $B_2O_3$; from about 10 mol % to about 40 mol % $P_2O_5$; and an optional addition of one or more of CaO, MgO and $Bi_2O_3$ from about 0 mol % to about 5 mol %. In some embodiments, these glass-ceramic compositions exhibit an average CTE (25-300° C.) of $40-65 \times 10^{-7}$/° C., dielectric constants of about 4-5, and/or loss tangents of 0.006 at signal frequencies of 1 GHz or greater.

In embodiments, the glass-ceramic employed in the clad layers 120 further comprises a boron-phosphate B(PO4) crystalline phase. The crystalline phase, according to some embodiments, can be derived from a ceramming process that can involve heating the glass-ceramic between about 750° C. and about 1150° C. for about 1 to about 10 hours. For example, in some implementations, these compositions can be cerammed by subjecting them to a nucleation heat treatment at 900° C. for 2 hours, followed by a crystal growth treatment at 1000° C. to 1100° C. for about 2 hours (i.e., to form a B(PO4) crystal phase). According to some embodiments, the crystalline phase can be derived from a heat treatment for about 1 to about 10 hours at a temperature from about 750° C. to about 1150° C., from about 750° C. to about 1100° C., from about 750° C. to about 1050° C., from about 750° C. to about 1000° C., from about 750° C. to about 950° C., from about 750° C. to about 900° C., from about 800° C. to about 1150° C., from about 800° C. to about 1100° C., from about 800° C. to about 1050° C., from about 800° C. to about 1000° C., from about 800° C. to about 950° C., from about 800° C. to about 900° C., and all values between these temperatures and times. It should also be understood that the ceramming can include multiple heat treatments at differing temperatures and durations between about 750° C. and about 1150° C. for about 1 to about 10 hours.

In some implementations, the clad layers 120 can be formed from a glass-ceramic composition of the disclosure, which includes: from about 55 mol % to about 75 mol % $SiO_2$; from about 10 mol % to about 30 mol % $B_2O_3$; from about 10 mol % to about 35 mol % $P_2O_5$; and each of CaO, MgO and $Bi_2O_3$ from about 0 mol % to about 5 mol %. According to other implementations, exemplary glass-ceramic compositions that can be employed for the clad layers 120 are provided below in Table 1 (identified as "Ex. A" through "Ex. R"), along with their average CTE values, along with loss tangent and dielectric constant ($D_k$) values for them at frequencies in excess of 1 GHz, along with lower frequencies from 1000 Hz to 1 MHz and 54 MHz to 599 MHz. Further, the glass-ceramics listed in Table 1 were subjected to a ceramming process, as noted in the "Heat Treatment" row (e.g., "1000° C./2 hrs" denotes a ceramming treatment at 1000° C. with a two hour hold). Finally, all cells in Table 1 denoted by "***" indicates that the data is not available for the particular condition associated with that cell.

TABLE 1

Exemplary glass-ceramic compositions with low loss tangents

| | Sample ID | | | | | | | | |
|---|---|---|---|---|---|---|---|---|---|
| | Ex. A | | | Ex. D | Ex. E | | Ex. G | | Ex. I |
| Lot # | | | | | | | | | |
| | 924CAQ | | | 924CEC | 924CED | | 924CEF | | 924CEH |
| Heat Treatment | | | | | | | | | |
| | | Ex. B 924CAR | Ex. C 924CAS | 850° C./ 2 hrs + 950° C./ | 850° C./ 2 hrs + 950° C./ | Ex. F 924CEE | 850° C./ 2 hrs + 950° C./ | Ex. H 924CEG | 850° C./ 2 hrs + 950° C./ |
| | 1000° C./ 2 hrs | 1000° C./ 2 hrs | 1100° C./ 2 hrs | 4 hrs | 4 hrs | 1000° C./ 2 hrs | 4 hrs | 1000° C./ 2 hrs | 4 hrs |
| $SiO_2$ (mol %) | 58.7 | 57.4 | 67.0 | 56.8 | 62.6 | 57.2 | 62.6 | 62.9 | 54.3 |
| $B_2O_3$ (mol %) | 14.1 | 13.7 | 21.0 | 13.6 | 13.3 | 13.4 | 16.2 | 19.2 | 28.0 |
| $P_2O_5$ (mol %) | 27.2 | 27.0 | 13.0 | 26.5 | 21.0 | 26.2 | 18.1 | 14.9 | 14.7 |
| CaO (mol %) | 0.0 | 2.0 | 0.0 | 0.0 | 0.0 | 0.0 | 0.0 | 0.0 | 0.0 |
| MgO (mol %) | 0.0 | 0.0 | 0.0 | 3.1 | 3.0 | 3.0 | 3.0 | 3.0 | 3.0 |
| $Bi_2O_3$ (mol %) | 0.0 | 0.0 | 0.0 | 0.0 | 0.0 | 0.0 | 0.0 | 0.0 | 0.0 |
| $SnO_2$ (mol %) | 0.0 | 0.0 | 0.0 | 0.09 | 0.10 | 0.10 | 0.09 | 0.10 | 0.09 |
| Avg. CTE - glass, RT-300° C. (ppm) | 5.53 | 5.88 | 4.28 | 5.34 | 4.89 | 4.34 | 4.45 | 4.34 | 4.57 |
| Avg. CTE - glass-ceramic, RT-300° C. (ppm) | *** | 5.24 | 5.37 | *** | *** | 4.72 | *** | 4.3 | *** |
| Loss tangent @ 1000 Hz-1 MHz | *** | *** | *** | *** | *** | *** | *** | *** | *** |
| Loss tangent @ 54 MHz-599 MHz | <0.001 | <0.001 | <0.001 | *** | *** | *** | *** | *** | *** |
| Loss tangent @ ~2.7 GHz | 0.00173 | 0.00116 | 0.00164 | 0.00142 | 0.00103 | *** | 0.00083 | *** | 0.00113 |
| Loss tangent @ ~5 GHz | 0.00304 | 0.00153 | 0.00286 | 0.00169 | 0.00125 | *** | 0.00098 | *** | 0.00184 |
| Loss tangent @ ~10 GHz | 0.00445 | 0.00248 0.00261 | 0.00297 | 0.00218 | 0.00166 | *** | 0.00122 | *** | 0.00312 |
| $D_k$ @ 1000 Hz-1 MHz | *** | *** | *** | *** | *** | *** | *** | *** | *** |
| $D_k$ @ 54 MHz-599 MHz | 4.48 | 4.51 | 4.05 | *** | *** | *** | 4.29 | *** | 4.13 |
| $D_k$ @ ~2.7 GHz | 4.51 | 4.53 | 4.06 | 4.53 | 4.36 | *** | *** | *** | *** |
| $D_k$ @ ~5 GHz | 4.49 | 4.49 | 4.06 | 4.50 | 4.34 | *** | 4.26 | *** | 4.10 |
| $D_k$ @ ~10 GHz | 4.50 | 4.51 | 4.04 | 4.50 | 4.34 | *** | 4.27 | *** | 4.11 |

| | Sample ID | | | | | | | | |
|---|---|---|---|---|---|---|---|---|---|
| | Ex. J | Ex. K | Ex. L | Ex. M | Ex. N | Ex. O | Ex. P | Ex. Q | Ex. R |
| Lot # | | | | | | | | | |
| | 924CAO | 924CAP | 924CAN | 924BZP | 924BZQ | 924BZR | 924BZT | 924BZS | 924BZU |
| Heat Treatment | | | | | | | | | |
| | 1100° C./ 2 hrs | 1100° C./ 2 hrs | 1000° C./ 2 hrs | 1000° C./ 2 hrs | 1000° C./ 2 hrs | 1000° C./ 2 hrs | 1000° C./ 2 hrs | 1000° C./ 2 hrs | 1000° C./ 2 hrs |
| $SiO_2$ (mol %) | 38 | 52.5 | 38.9 | 50.3 | 49.7 | 49.3 | 44.1 | 48.2 | 42.8 |
| $B_2O_3$ (mol %) | 24.4 | 16.9 | 25.1 | 24.8 | 24 | 24.1 | 27.3 | 23.3 | 27 |
| $P_2O_5$ (mol %) | 35.5 | 30.6 | 36.1 | 25 | 24.3 | 23.8 | 28.5 | 23.8 | 28.3 |
| CaO (mol %) | 2.1 | 0.0 | 0 | 0.0 | 2 | 0.0 | 0.0 | 0.0 | 0.0 |
| MgO (mol %) | 0.0 | 0.0 | 0 | 0.0 | 0.0 | 2.75 | 0.0 | 0.0 | 1.9 |
| $Bi_2O_3$ (mol %) | 0.0 | 0.0 | 0 | 0.0 | 0.0 | 0.0 | 0.0 | 4.72 | 0.0 |
| $SnO_2$ (mol %) | 0.0 | 0.0 | 0.0 | 0.0 | 0.0 | 0.0 | 0.0 | 0.0 | 0.0 |
| Avg. CTE - glass, RT-300° C. (ppm) | 6.38 | 5.49 | 6.04 | 5.64 | 5.67 | 5.56 | 5.82 | 6.18 | 5.92 |
| Avg. CTE - glass-ceramic, RT-300° C. (ppm) | 5.11 | 4.83 | 6.05 | 5.03 | 5.3 | 5.29 | 5.48 | 5.7 | 5.69 |
| Loss tangent @ 1000 Hz-1 MHz | *** | *** | *** | 0.003-0.0003 | 0.0002 | 0.0003 | 0.0005 | 0.0013 | 0.0003 |
| Loss tangent @ 54 MHz-599 MHz | <0.001 | <0.001 | *** | *** | *** | <0.001 | <0.001 | *** | <0.001 |
| Loss tangent @ ~2.7 GHz | *** | 0.00173 | *** | *** | *** | 0.00072 | 0.00077 | *** | 0.00057 |
| Loss tangent @ ~5 GHz | *** | 0.00304 | *** | *** | *** | 0.00094 | 0.00173 | *** | 0.00080 |
| Loss tangent @ ~10 GHz | *** | 0.00445 | *** | *** | *** | 0.00240 | 0.00509 | *** | 0.00209 |
| $D_k$ @ 1000 Hz-1 MHz | *** | *** | *** | 4.52 | 4.47 | 4.4 | 4.6 | 5.5 | 4.54 |
| $D_k$ @ 54 MHz-599 MHz | 4.57 | 4.55 | *** | *** | *** | 4.35 | 4.45 | *** | 4.4 |
| $D_k$ @ ~2.7 GHz | *** | 4.53 | *** | *** | *** | 4.41 | 4.50 | *** | 4.49 |
| $D_k$ @ ~5 GHz | *** | 4.52 | *** | *** | *** | 4.39 | 4.49 | *** | 4.48 |
| $D_k$ @ ~10 GHz | *** | 4.53 | *** | *** | *** | 4.43 | 4.50 | *** | 4.51 |

According to some implementations of the glass-ceramics of the disclosure, which can be employed in the clad layers 120 of a glass-ceramic laminate 100 (see FIG. 1), the total amount of MgO, CaO and $Bi_2O_3$ is less than or equal to about 5 mol %, in other embodiments, less than or equal to about 2 mol % and, in particular embodiments, the glass-ceramic is substantially free of alkaline earth modifiers.

With further regard to the glass-ceramic compositions of the disclosure, including the exemplary compositions listed in Table 1, each of the oxide components serves a function. Pure $SiO_2$ has a low CTE and, due to its high melting temperature, it is incompatible with fusion draw processes. Accordingly, the amount of $SiO_2$ in the glass-ceramics of the disclosure ranges from about 30 mol % to about 80 mol %, in other embodiments, from about 35 mol % to about 75 mol % and, in particular embodiments, from about 55 mol % to about 75 mol %. As such, the amount of $SiO_2$ can range from about 30 mol % to about 80 mol %, from about 30 mol % to about 75 mol %, from about 30 mol % to about 70 mol %, from about 40 mol % to about 80 mol %, from about 40 mol % to about 75 mol %, from about 40 mol % to about 70 mol %, from about 50 mol % to about 80 mol %, from about 50 mol % to about 75 mol %, from about 50 mol % to about 70 mol %, from about 55 mol % to about 80 mol %, from about 55 mol % to about 75 mol %, from about 55 mol % to about 70 mol %, and all $SiO_2$ amounts between these levels.

Referring again to the glass-ceramic compositions of the disclosure, as listed in Table 1, network formers, $B_2O_3$ and $P_2O_5$, are included in these compositions to ensure the formation of a stable glass (prior to the development of crystals), minimize the CTE, and to facilitate melting and forming. By mixing these network formers in appropriate concentrations with $SiO_2$, it is possible to achieve a stable bulk glass, while minimizing the need for additional network modifiers, such as alkali metals oxides.

With regard to the $B_2O_3$ in the glass-ceramics of the disclosure, this metal oxide can serve to reduce the viscosity of the glass, to facilitate formation processes, including fusion draw formation processes. Accordingly, the amount of $B_2O_3$ in the glass-ceramics of the disclosure ranges from about 5 mol % to about 50 mol %, in other embodiments, from about 10 mol % to about 40 mol % and, in particular embodiments, from about 10 mol % to about 30 mol %. As such, the amount of $B_2O_3$ can range from about 5 mol % to about 50 mol %, from about 5 mol % to about 40 mol %, from about 5 mol % to about 30 mol %, from about 10 mol % to about 50 mol %, from about 10 mol % to about 40 mol %, from about 10 mol % to about 30 mol %, from about 15 mol % to about 50 mol %, from about 15 mol % to about 40 mol %, from about 15 mol % to about 30 mol %, and all $B_2O_3$ amounts between these levels.

With regard to the $P_2O_5$ in the glass-ceramics of the disclosure, this metal oxide can serve to assist in the formation of a stable bulk glass, in combination with $SiO_2$ and $B_2O_3$. In addition, $P_2O_5$ can crystallize as B(PO4) in the glass (e.g., through a ceramming or heat treatment process after formation) and the presence of this crystalline phase can serve to offset the negative effects of other constituents with regard to the loss tangent properties of the resulting material. That is, the presence of the B(PO4) phase tends to advantageously reduce the loss tangent values of the glass-ceramic as compared to the loss tangent values exhibited by a glass with the same composition. Accordingly, the amount of $P_2O_5$ in the glass-ceramics of the disclosure ranges from about 5 mol % to about 50 mol %, in other embodiments, from about 10 mol % to about 40 mol % and, in particular embodiments, from about 10 mol % to about 35 mol %. As such, the amount of $P_2O_5$ can range from about 5 mol % to about 50 mol %, from about 5 mol % to about 40 mol %, from about 5 mol % to about 35 mol %, from about 10 mol % to about 50 mol %, from about 10 mol % to about 40 mol %, from about 10 mol % to about 35 mol %, from about 15 mol % to about 50 mol %, from about 15 mol % to about 40 mol %, from about 15 mol % to about 35 mol %, and all $P_2O_5$ amounts between these levels.

According to some embodiments of the glass-ceramics of the disclosure, $Al_2O_3$ can be included from about 0.005 mol % to about 1 mol %. In some implementations, $Al_2O_3$ can be included from about 0.005 mol % to about 0.5 mol %, from about 0.005 mol % to about 0.05 mol %, and all values of $Al_2O_3$ between these amounts. In general, the presence of $Al_2O_3$ can serve to increase the rigidity of the resulting glass-ceramic of the disclosure. Nevertheless, the $Al_2O_3$, if present, should be carefully controlled in the glass-ceramics of the disclosure as it is believed that it can inhibit the formation of the B(PO4) crystalline phase. That is, without being bound by theory, it is believed that the presence of excess amounts of $Al_2O_3$ above 1 mol % can negatively impact the formation of B(PO4), which would have the net effect of negatively influencing the loss tangent properties of the resulting glass-ceramic.

According to some implementations of the glass-ceramics of the disclosure, one or more alkaline earth oxides, such as MgO, CaO and SrO, and/or other metal oxides, such as $Bi_2O_3$, can be added in amounts from 0 mol % to about 5 mol %. These metal oxides can improve the melting behavior of the glass-ceramic compositions of the disclosure. In some embodiments, the total amount of MgO, CaO and $Bi_2O_3$ is less than or equal to about 5 mol %. In other embodiments, alkaline earth oxides are present only in trace contaminant levels (i.e., less than or equal to 100 ppm). In other embodiments, the glass-ceramics are substantially free of alkaline earth oxides.

In some embodiments, the glass-ceramics of the disclosure can include at least one fining agent such as $SnO_2$, $CeO_2$, $As_2O_3$, $Sb_2O_3$, $Cl^-$, $F^-$, or the like in small concentrations to aid in reducing or otherwise eliminating gaseous inclusions during melting. In some embodiments, the glass-ceramic can comprise from about 0.005 mol % to about 0.7 mol % $SnO_2$, from about 0.005 mol % to about 0.5 mol % $SnO_2$, or from 0.005 mol % to about 0.2 mol % $SnO_2$.

As noted earlier, the glass-ceramics of the disclosure, including the exemplary glass-ceramics listed in Table 1, can include a boron-phosphate (B(PO4)) crystalline phase. The crystalline phase, according to some embodiments, can be derived from a ceramming process that can involve heating the glass-ceramic between about 850° C. and about 1150° C. for about 1 to about 10 hours. In some implementations, these compositions can be cerammed by subjecting them to a nucleation heat treatment at 900° C. for 2 hours, followed by a crystal growth treatment at 1000° C. to 1100° C. for about 2 hours (i.e., to form a B(PO4) crystal phase). In other implementations, these compositions can be subjected to a ceramming treatment that includes heating the glass at 850° C. for two hours, followed by a heat treatment at 900° C. with a four hour hold or 950° C. with a four hour hold. According to some embodiments, the ceramming can include a heat treatment at 875° C. with a hold of about six hours.

Figure 2:
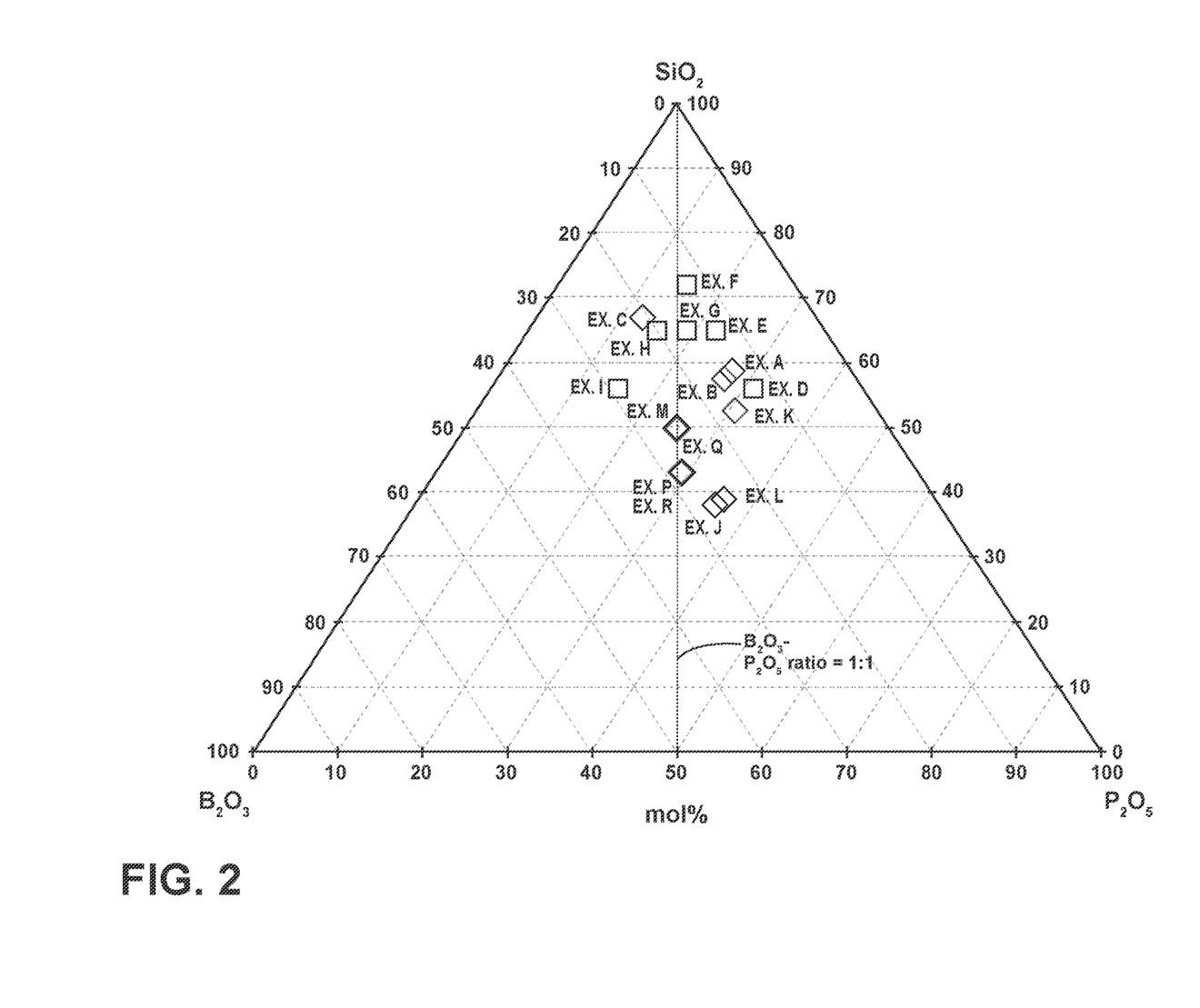
FIG. 2 is a ternary phase diagram of a $B_2O_3$—$P_2O_5$—$SiO_2$ system, as depicting example glass-ceramic compositions according to embodiments of the disclosure.

Referring now to FIG. 2, a ternary phase diagram of a $B_2O_3$—$P_2O_5$—$SiO_2$ system is provided, as depicting example glass-ceramic compositions according to embodiments of the disclosure. As noted in the phase diagram, certain of the exemplary glass-ceramic compositions that are listed in Table 1 are denoted graphically (e.g., "Ex. A"; "Ex. C", and others). More particularly, each of the glass-ceramic compositions depicted in FIG. 2 are exemplary of the glass-ceramics of the disclosure and exhibit good dielectric loss properties at frequencies of 1 GHz or more (e.g., loss tangent values of 0.006 or less at frequencies of 1 GHz or more). Further, it should be understood that for those compositions listed in Table 1 which only loss tangent data at less than 1 GHz (i.e., from 1000 Hz to 1 MHz; and 54 MHz to 599 MHz), a microwave loss tangent at about 10 GHz can be estimated from the linear fitting of the loss tangent data at less than 1 GHz. Such linear fitting indicates that the microwave loss tangent at about 10 GHz is less than 0.006. In addition, for those compositions listed in Table 1 with no loss tangent data, it is believed that these glass-ceramic compositions also exhibit loss tangent values of less than 0.006 at frequencies in excess of about 1 GHz given the similarity of these compositions with other glass-ceramic compositions having measured loss tangent data presented in Table 1.

As also shown in FIG. 2, balancing the amount of $B_2O_3$ and $P_2O_5$ in the glass-ceramics of the disclosure can result in an advantageous combination of formability and dielectric loss properties. For example, a line denoting a $B_2O_3$—$P_2O_5$ ratio of 1:1 is shown in FIG. 2 to graphically demonstrate the $B_2O_3$—$P_2O_5$ ratios of the exemplary compositions depicted in this figure. According to implementations of the glass-ceramic compositions of the disclosure, the ratio of $B_2O_3$ to $P_2O_5$ can be selected to range from 1:2 to 2:1, or from 1:1.5 to 1.5:1 according to some additional implementations.

Figure 3:
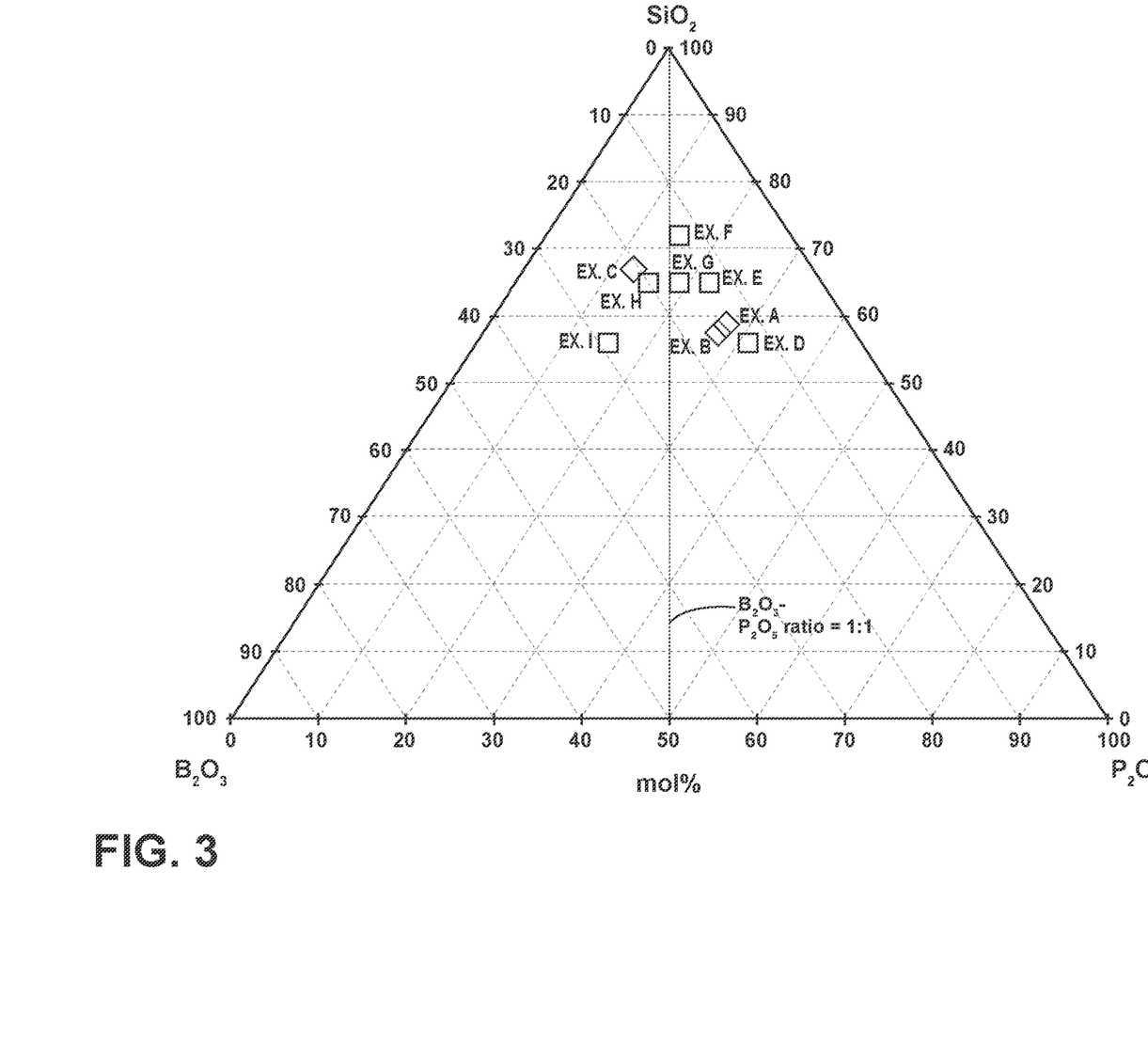
FIG. 3 is a ternary phase diagram of a $B_2O_3$—$P_2O_5$—$SiO_2$ system, as depicting example glass-ceramic compositions having a liquidus viscosity of greater than 10 kPoise according to embodiments of the disclosure.

Referring now to FIG. 3, a ternary phase diagram of a $B_2O_3$—$P_2O_5$—$SiO_2$ system, as depicting certain exemplary glass-ceramic compositions listed in Table 1, is provided. In particular, the glass-ceramic compositions depicted in FIG. 3 have a liquidus viscosity of greater than 10 kPoise, along with excellent dielectric loss properties at frequencies of 1 GHz or greater, according to embodiments of the disclosure. As such, these glass-ceramic compositions are particularly suited for fusion draw processes, such as slot draw and laminate fusion draw approaches. More particularly, FIG. 3 demonstrates that maintaining $SiO_2$ levels in the glass-ceramics between about 55 mol % and about 75 mol % can be advantageous in balancing formability with dielectric loss properties.

Figure 4:
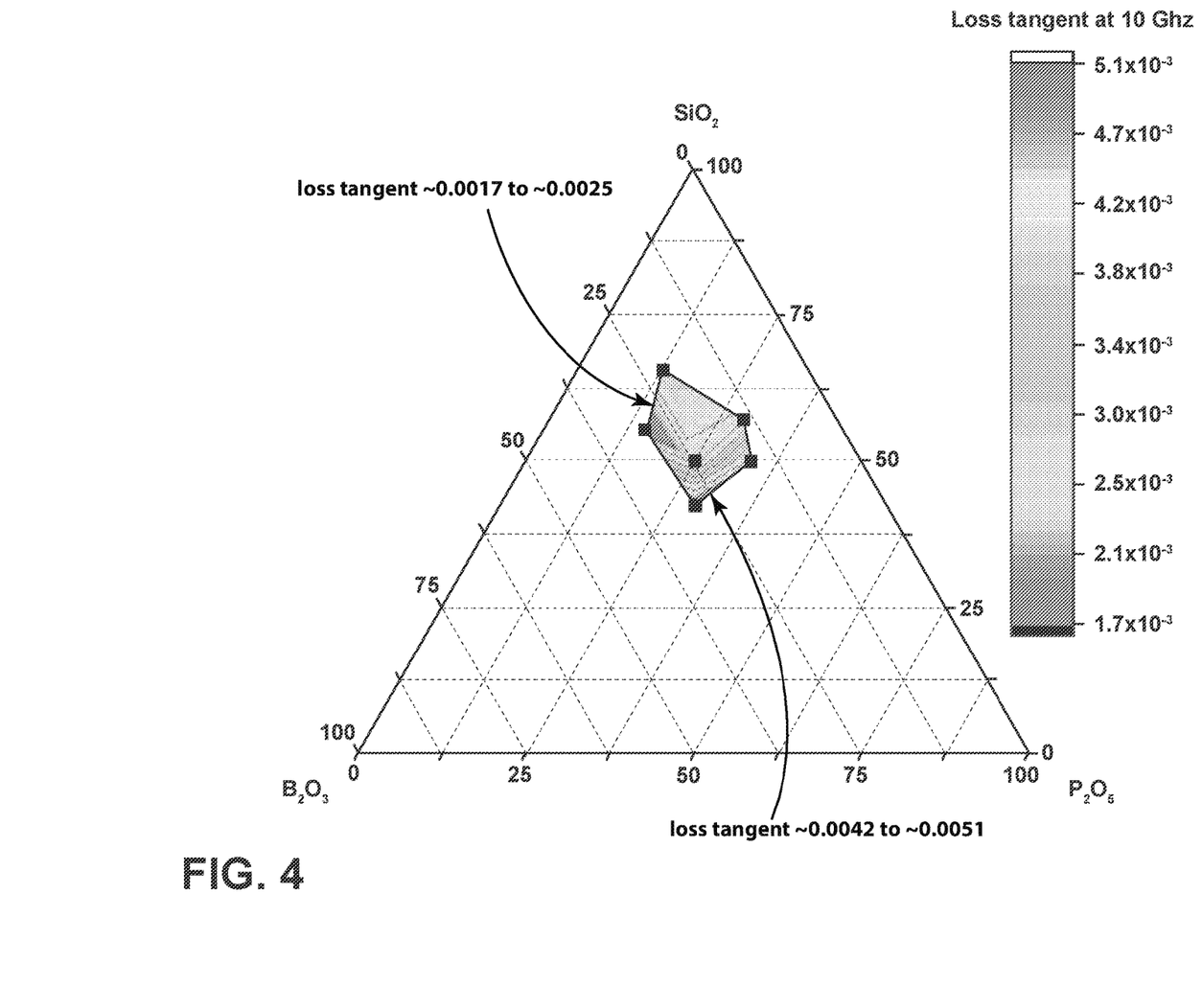
FIG. 4 is a ternary phase diagram of a $B_2O_3$—$P_2O_5$—$SiO_2$ system, as depicting example glass-ceramic compositions and loss tangent data associated with them, according to embodiments of the disclosure.

With regard to FIG. 4, a ternary phase diagram of a $B_2O_3$—$P_2O_5$—$SiO_2$ system, as depicting example glass-ceramic compositions and loss tangent data associated with them, is provided according to embodiments of the disclosure. That is, certain of the exemplary glass-ceramic compositions listed in Table 1 are also depicted graphically in FIG. 4, along with their loss tangent values as measured at 10 GHz. It is evident from FIG. 4 that minimizing $P_2O_5$ (e.g., to less than about 50 mol %) can tend to result in lower, and therefore more advantageous, loss tangent values at 10 GHz. Likewise, FIG. 4 demonstrates that maximizing the amount of $B_2O_3$ and/or $SiO_2$ (e.g., to greater than about 50 mol %) can also result in lower loss tangent values at 10 GHz. Nevertheless, the relative amounts of $SiO_2$, $P_2O_5$ and $B_2O_3$ in the glass-ceramics should remain within the general limits (as noted earlier): from about 35 mol % to about 80 mol % $SiO_2$; from about 10 mol % to about 50 mol % $B_2O_3$; and from about 10 mol % to about 50 mol % $P_2O_5$.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A glass-ceramic, comprising:
   $SiO_2$ from about 35 mol % to about 80 mol %;
   $B_2O_3$ from about 10 mol % to about 50 mol %;
   $P_2O_5$ from about 23 mol % to about 50 mol %, wherein the ratio of $B_2O_3$ to $P_2O_5$ ranges from 1:2 to 2:1; and
   an optional addition of one or more of CaO, MgO and $Bi_2O_3$ from 0 mol % to about 5 mol %,
   wherein the glass-ceramic further comprises a boron-phosphate crystalline phase.

2. The glass-ceramic according to claim 1, wherein the glass-ceramic comprises an average coefficient of thermal expansion (CTE) of about $40 \times 10^{-7}/°$ C. to about $65 \times 10^{-7}/°$ C., as measured from 25° C. to 300° C.

3. The glass-ceramic according to claim 1, further comprising:
   $Al_2O_3$ from about 0.005 mol % to about 1 mol %.

4. The glass-ceramic according to claim 1, further comprising:
   $SnO_2$ from about 0.005 mol % to about 0.5 mol %.

5. The glass-ceramic according to claim 1, further comprising:
   $SiO_2$ from about 55 mol % to about 62 mol %;
   $B_2O_3$ from about 10 mol % to about 30 mol %; and
   $P_2O_5$ from about 23 mol % to about 35 mol %.

6. The glass-ceramic according to claim 1, the boron-phosphate crystalline phase being derived from ceramming of the glass-ceramic between about 750° C. and about 1150° C. for about 1 to about 10 hours.

7. A glass-ceramic, comprising:
   $SiO_2$ from about 35 mol % to about 80 mol %;
   $B_2O_3$ from about 10 mol % to about 50 mol %;
   $P_2O_5$ from about 10 mol % to about 50 mol %, wherein the ratio of $B_2O_3$ to $P_2O_5$ ranges from 1:2 to 2:1; and
   an optional addition of one or more of CaO, MgO and $Bi_2O_3$ from 0 mol % to about 5 mol %,
   wherein the glass-ceramic further comprises a loss tangent of 0.006 or less for signals having a frequency of 1 GHz.

8. The glass-ceramic according to claim 7, wherein the glass-ceramic comprises an average coefficient of thermal expansion (CTE) of about $40 \times 10^{-7}/°$ C. to about $65 \times 10^{-7}/°$ C., as measured from 25° C. to 300° C.

9. The glass-ceramic according to claim 7, wherein the glass-ceramic further comprises a loss tangent of 0.003 or less for signals having a frequency of 1 GHz.

10. The glass-ceramic according to claim 7, further comprising:
    $Al_2O_3$ from about 0.005 mol % to about 1 mol %.

11. The glass-ceramic according to claim 7, further comprising:
    $SnO_2$ from about 0.005 mol % to about 0.5 mol %.

12. The glass-ceramic according to claim 7, further comprising:
    $SiO_2$ from about 55 mol % to about 75 mol %;
    $B_2O_3$ from about 10 mol % to about 30 mol %; and
    $P_2O_5$ from about 10 mol % to about 35 mol %.

13. A glass-ceramic, comprising:
    $SiO_2$ from about 35 mol % to about 80 mol %;
    $B_2O_3$ from about 10 mol % to about 50 mol %;

$P_2O_5$ from about 10 mol % to about 50 mol %, wherein the ratio of $B_2O_3$ to $P_2O_5$ ranges from 1:2 to 2:1; and
one or more of CaO, MgO and $Bi_2O_3$ from greater than 0 mol % to about 5 mol %,
wherein the glass-ceramic further comprises a loss tangent of 0.006 or less for signals having a frequency of 1 GHz.

14. The glass-ceramic according to claim 13, wherein the glass-ceramic comprises an average coefficient of thermal expansion (CTE) of about $40 \times 10^{-7}$/° C. to about $65 \times 10^{-7}$/° C., as measured from 25° C. to 300° C.

15. The glass-ceramic according to claim 13, wherein the glass-ceramic further comprises a loss tangent of 0.003 or less for signals having a frequency of 1 GHz.

16. The glass-ceramic according to claim 13, further comprising:
$Al_2O_3$ from about 0.005 mol % to about 1 mol %.

17. The glass-ceramic according to claim 13, further comprising:
$SnO_2$ from about 0.005 mol % to about 0.5 mol %.

18. The glass-ceramic according to claim 13, further comprising:
$SiO_2$ from about 55 mol % to about 75 mol %;
$B_2O_3$ from about 10 mol % to about 30 mol %; and
$P_2O_5$ from about 10 mol % to about 35 mol %.

19. The glass-ceramic according to claim 13, wherein the glass-ceramic further comprises a boron-phosphate crystalline phase.

20. The glass-ceramic according to claim 19, the boron-phosphate crystalline phase being derived from ceramming of the glass-ceramic between about 750° C. and about 1150° C. for about 1 to about 10 hours.

21. A laminate article comprising:
a core glass layer; and
a plurality of clad layers laminated to the core glass layer and comprising the glass-ceramic according to claim 1.

22. The glass-ceramic according to claim 1, wherein the ratio of $B_2O_3$ to $P_2O_5$ ranges from 1:1.5 to 1.5:1.

23. The glass-ceramic according to claim 7, further comprising:
$SiO_2$ from about 55 mol % to about 62 mol %; and
$P_2O_5$ from about 23 mol % to about 35 mol %.

24. The glass-ceramic according to claim 13, further comprising:
$SiO_2$ from about 55 mol % to about 62 mol %; and
$P_2O_5$ from about 23 mol % to about 35 mol %.

* * * * *

UNITED STATES PATENT AND TRADEMARK OFFICE
CERTIFICATE OF CORRECTION

| | |
|---|---|
| PATENT NO. | : 11,236,012 B2 |
| APPLICATION NO. | : 17/040070 |
| DATED | : February 1, 2022 |
| INVENTOR(S) | : George Halsey Beall et al. |

It is certified that error appears in the above-identified patent and that said Letters Patent is hereby corrected as shown below:

On the Title Page

On the page 2, in Column 2, item (56) under "Other Publications", Line 28, delete "(2000." and insert -- (2000). --.

Signed and Sealed this
Seventeenth Day of May, 2022

*Katherine Kelly Vidal*

Katherine Kelly Vidal
*Director of the United States Patent and Trademark Office*